United States Patent [19]
Kressel et al.

[11] 3,747,016
[45] July 17, 1973

[54] SEMICONDUCTOR INJECTION LASER

[75] Inventors: Henry Kressel, Elizabeth; Frank Zygmunt Hawrylo, Trenton, both of N.J.

[73] Assignee: RCA Corporation, New York, N.Y.

[22] Filed: Aug. 26, 1971

[21] Appl. No.: 175,197

[52] U.S. Cl.......... 331/94.5 H, 148/175, 317/235 R
[51] Int. Cl............................................... H01s 3/00
[58] Field of Search............................ 331/94.5 H; 317/235 N, 235 AC

[56] References Cited
UNITED STATES PATENTS
3,245,002  4/1966  Hall .................................. 331/94.5
3,537,029  10/1970  Kressel et al. ..................... 331/94.5
3,456,209  7/1969  Diemer............................ 331/94.5
3,604,991  9/1971  Yonezu et al.................. 331/94.5 X

OTHER PUBLICATIONS

Butler et al. "High Order Transverse Cavity Modes in Heterojunction Lasers," Applied Physics Letters, Vol. 17, pp. 403–406, November 1970.
Dyment: "Hermite–Gaussien Mode Patterns In GaAs Junction Lasers," Applied Physics Letters, Vol. 10, pp. 84–86, Feb. 1, 1967.
Hayashi et al.: "Junction Lasers Which Operate Continuously at Room Temperature," Applied Physics Letters, Vol. 17, pp. 109–111, Aug. 1, 1970.

*Primary Examiner*—Edward S. Bauer
*Attorney*—Glenn H. Bruestle

[57] ABSTRACT

A semiconductor injection laser which emits a beam of radiation having improved beam divergence has a body of semiconductor material including a first region of one conductivity type, a second region of the opposite conductivity type and a third region of either conductivity type between the first and second regions and forming a PN junction with one of the first or second regions. The junctions between the third region and each of the first and second regions are heterojunctions which extend in substantially parallel relation to the edges of the body. The third region is of a thickness of between 0.2 and 0.3 microns and has an index of refraction which is no greater than about 0.05 higher than the index of refraction of each of the first and second regions so as to permit some of the light generated in the third region to spread out into each of the first and second regions.

8 Claims, 3 Drawing Figures

INVENTORS.
HENRY KRESSEL &
FRANK Z. HAWRYLO
BY Donald S. Cohen
ATTORNEY

SEMICONDUCTOR INJECTION LASER

BACKGROUND OF THE INVENTION

The invention herein disclosed was made in the course of or under a contract or subcontract thereunder with the Department of the Army.

The present invention relates to a semiconductor injection laser, and, more particularly to a semiconductor injection laser having a reduced beam divergence.

Semiconductor injection lasers, in general, are bodies of a single crystalline semiconductor material which, when biased, emit light, either visible or infrared, through the recombination of pairs of oppositely charged carriers. Such devices generally include regions of opposite conductivity type forming a PN junction therebetween. When the junction is properly biased, charge carriers of one type are injected from one of the regions into the other where the predominant charge carriers are of the opposite type so as to achieve the light generating recombination.

To provide a semiconductor injection laser which is capable of efficient emission of stimulated radiation at room temperature, various structures have been devised which include an optically confining cavity between regions of opposite conductivity type in which the generation of radiation by the recombination of the charge carriers occurs. The cavity is generally a narrow region extending across the semiconductor body between the ends and side edges of the body. Optical confinement is usually achieved by making the regions of the body on each side of the cavity of a material having an index of refraction lower than that of the material of the cavity. The side edges and one end edge of the body is made reflective and the other end edge is made partially transmitting so as to form a Fabry-Perot cavity. Thus, the radiation generated in the optically confining cavity is emitted from the partially transmitting end edge of the body as a beam of coherent radiation. Some structures of semiconductor injection lasers having optically confining cavities are described in the articles "Close-Confinement Gallium Arsenide PN Junction Lasers with Reduced Optical Loss at Room Temperature" by H. Kressel et al., RCA REVIEW, Volume 30 No. 1, pages 106–113, March, 1969, "High-Order Transverse Cavity Modes in Heterojunction Diode Lasers" by J. Butler et al., APPLIED PHYSICS LETTERS, Vol. 17, No. 9, Nov. 1, 1970, pgs. 403–406, and "An Efficient Large Optical Cavity Injection Laser" by H.F. Lockwood et al., APPLIED PHYSICS LETTERS, Vol. 17, No. 12 Dec. 1, 1970, pgs. 499–502.

A problem with such optically confining cavity semiconductor injection lasers is the divergence of the beam of radiation emitted by the lasers. By "divergence" of the beam is meant that the beam spreads out as it moves away from the emitting end edge of the laser. Thus, the cross-sectional area of the beam in a plane perpendicular to the PN junction of the laser increases along the beam in the direction away from the laser.

In the use of semiconductor lasers the emitted beam of light is directed at a target and it is desirable that the beam contact the target as a spot of controlled area. Therefore, it is desirable that the emitted beam be columnar, i.e., of uniform cross-sectional area along its length, or at least have a minimum of divergence so as to simplify the lensing system which may be needed in the optical system between the semiconductor laser and the target to achieve the desired spot of light at the target. It has been found that merely changing the thickness of the optically confining cavity does not reduce the beam divergence in the direction perpendicular to the junction beyond a minimum amount. For example, a semiconductor injection laser having an optically confining cavity of about 2 microns in thickness provides an emitted beam of radiation having a divergence of about 20° in the direction perpendicular to the junction. If the cavity is made thinner, the divergence of the emitted beam increases, and if the cavity is made thicker, there is created a second propagating mode of the generated light which causes the emission of two or more separate divergent beams of radiation rather than a single beam.

SUMMARY OF THE INVENTION

A semiconductor injection laser including a body of single crystalline semiconductor material having a first region of one conductivity type, a second region of a conductivity type opposite to that of the first region and a third region of either conductivity type between the first and second regions. The junctions between the third region and each of the first and second regions are substantially parallel and extend to an edge of the body. The third region is of a thickness of between 0.2 and 0.3 microns and has an index of refraction at the lasing wavelength which is slightly higher than the index of refraction of each of the first and second regions.

THE PREFERRED EMBODIMENT STRUCTURE

Figure 1:
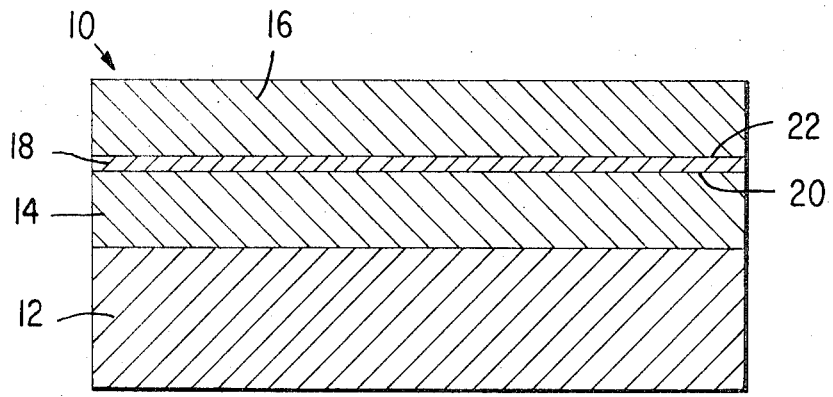
FIG. 1 is a cross-sectional view of a semiconductor injection laser in accordance with the present invention.

Referring initially to FIG. 1, the semiconductor injection laser of the present invention is generally designated as 10. The semiconductor injection laser 10 comprises a flat substrate 12 of an N type single crystalline semiconductor material, such as gallium arsenide having a dopant concentration of about $10^{18} cm^{-3}$. On a surface of the substrate 12 is a first region 14 of single crystalline N type semiconductor material. A second region 16 of single crystalline P type semiconductor material is over the first region 14, and a thin third region 18 of single crystalline semiconductor material is between the first region 14 and the second region 16.

The third region 18 is of a thickness between 0.2 and 0.3 microns. The junctions 20 and 22 between the third region 18 and each of the first and second regions 14 and 16, respectively, are heterojunctions and extend in substantially parallel relation to one another to the edges of the semiconductor injection laser 10. The third region 18 is preferably of P type conductivity although it can also be of N type conductivity. The third region 18 is preferably heavily doped and closely compensated with both P type and N type dopants. The total concentration of the dopants in the third region 18 is preferably about $10^{19} cm^{-3}$ with the difference in the dopant concentration between the P type and N type dopants being about $10^{17} cm^{-3}$. If the third region 18 is of P type conductivity, the concentration of the P type dopant is higher than that of the N type dopant and vice versa.

Most importantly, the third region 18 is of a semiconductor material which has an index of refraction which is only slightly higher than the index of refraction of the semiconductor material of each of the first and second regions 14 and 16. The difference in the index of refraction should be no greater than about 0.05 at the lasing wavelength of the laser 10. This difference in the index of refraction can be achieved by making the third region 18 of a semiconductor material which has a band gap energy which is slightly lower than the band gap energy of the semiconductor materials of the first and second regions 14 and 16. A difference in the band gap energies of no greater than about 0.2 eV will provide the desired difference in the index of refraction.

There are various semiconductor materials, particularly among the group III-V semiconductor compounds and alloys thereof, which have different band gap energies and which can be used for the regions of the laser 10. For example, the third region 18 can be made of gallium arsenide which is doped with silicon, an amphoteric dopant, and zinc, as the P type dopant, in the proper amounts to provide a compensated region of the desired conductivity type specified above. The first and second regions 14 and 16 can be made of gallium aluminum arsenide which has a higher band gap energy than gallium arsenide. The band gap energy of gallium aluminum arsenide can be varied by varying the amount of aluminum in the compound. Thus, by making the amount of aluminum in the compound small, i.e., $Ga_{1-x}Al_xAs$ where x is between 0.1 and 0.15, the desired band gap energy difference between the third region 18 and each of the first and second regions 14 and 16 can be achieved. The material of the first region 14 can contain tellurium as the N type dopant and the material of the second region can contain zinc as the P type dopant. The dopant concentration in each of the first and second regions 14 and 16 is preferably about $10^{18} cm^{-3}$. Alternatively, the third region 18, as well as the first and second regions 14 and 16, can be made of gallium aluminum arsenide, with the amount of aluminum in the material of the third region 18 being slightly less than the amount of aluminum in the materials of the first and second regions 14 and 16 so as to provide the required difference in the band gap energies of the regions.

The semiconductor injection laser 10 is generally in the form of a rectangular parallelopiped. It is formed into a Fabry-Perot cavity by making a pair of opposite side edges and one end edge reflective and the other end edge partially transparent. Terminals are attached to the second region 16 and to the substrate 12 to permit the laser 10 to be connected to a suitable voltage source.

GENERAL OPERATION

Figure 2:
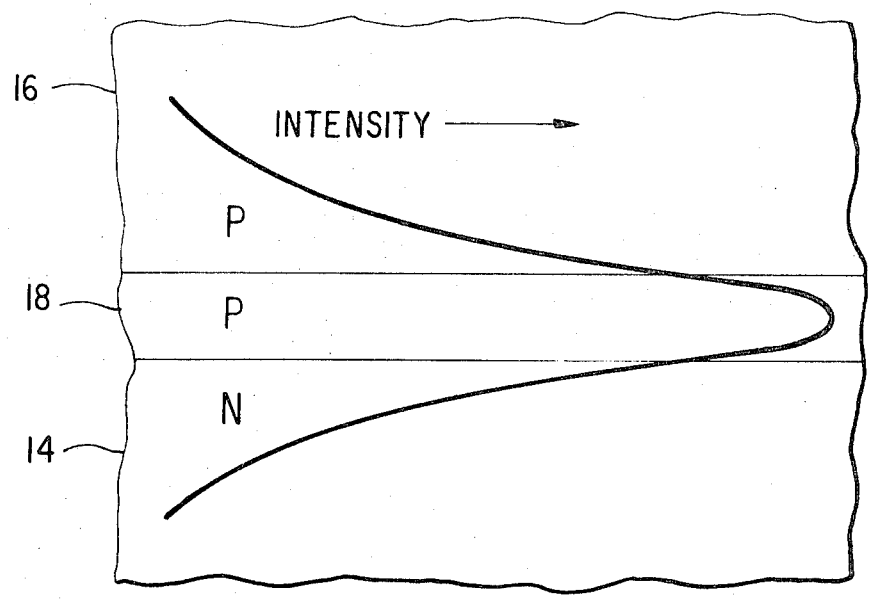
FIG. 2 is a diagram showing the intensity and position of the light generated in the semiconductor injection laser shown in FIG. 1 at the emitting surface of the laser.

Considering a semiconductor injection laser 10 in which the third region 18 is of P type conductivity, the PN junction of the laser 10 is the junction 20 between the third region 18 and the first region 14. Upon the application of a forward bias voltage to the PN junction 20, electrons are injected from the N type first region 14 into the P type third region 18 and holes from region 16. The injection electrons undergo radiative recombination in the third region 18 with the result that light is generated in the third region 18. Since the third region 18 has an index of refraction higher than the index of refraction of each of the first and second regions 14 and 16, a significant portion of the generated light is confined within the third region 18. However, since the difference in the index of refraction is small, some of the light spreads out into each of the first and second regions 14 and 16. The light in the third region 18 propagates along the third region and is emitted from the partially transparent end edge of the laser 10. Laser action, i.e., the emission of stimulated radiation, is obtained by the application of sufficient voltage to produce a current density in excess of the lasing threshold value. As shown in FIG. 2, above the lasing threshold, the intensity of the generated light is symmetrically distributed with the portion of maximum intensity being within the third region 18 and the intensity of the light diminishing into each of the first and second regions 14 and 16.

In the semiconductor injection laser 10, by allowing some of the light generated in the third region 18 to spread out into the first and second regions 14 and 16, the beam of stimulated radiation emitted from the laser 10 at a given laser threshold value has a divergence less than that of the beams emitted by other types of optically confining cavity semiconductor injection lasers operating at the same threshold value. Reductions in beam divergence by a factor of greater than two have been achieved by the semiconductor injection laser 10 while maintaining low thresholds and relatively high efficiencies.

Thus, the semiconductor injection laser 10 provides a more columnar beam of light so as to permit the use of a more simplified optical system between the laser and a target in order to provide a small spot of light on the target. By having the third region 18 of a thickness of between 0.2 and 0.3 microns, the lasing threshold of the laser is minimized.

A semiconductor injection laser 10 having an N type third region 18 operates in the same manner as described above except that the PN junction is the junction 22 between the third region 18 and the second region 16. Also the generation of light results from the injection of electrons and holes from the first and second regions 14 and 16 respectively into the third region 18 where the recombination takes place.

METHOD OF MAKING PREFERRED EMBODIMENT

The semiconductor injection laser 10 may be made by epitaxially depositing the regions on the substrate 12 with the first region 14 being deposited first, then the third region 18 on the first region 14 and finally the second region 16 on the third region 18. The regions are preferably deposited by liquid phase epitaxy. The regions may be sequentially deposited on the substrate by liquid phase epitaxy using the method and apparatus described in U.S. Pat. No. 3,565,702, issued Feb. 23, 1971 to H. Nelson, entitled "Depositing Successive Epitaxial Semiconductor Layers From The Liquid Phase."

Figure 3:
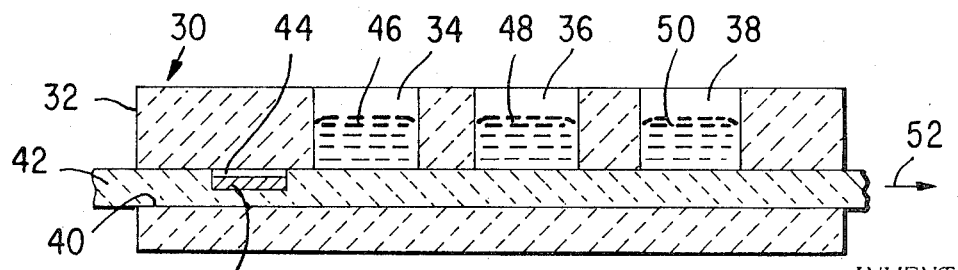
FIG. 3 is a cross-sectional view of an apparatus for making the semiconductor injection laser.

Referring to FIG. 3, there is shown an apparatus, generally designated as 30, which is suitable for making the semiconductor injection laser 10. The apparatus 30 comprises a refractory furnace boat 32 of an inert material, such as graphite. The upper surface of the boat 32 has three spaced wells 34, 36 and 38 therein. A passage 40 extends longitudinally through the boat 32 and crosses the bottoms of the wells 34, 36 and 38. A slide 42 of a refractory material such as graphite, movably extends through the passage 40 so that the upper surface of the slide is coplanar with the plane of the bottom of each of the wells 34, 36 and 38. A recess 44 is provided in the upper surface of the slide 42 adjacent one end of the slide. The recess 44 is of a size to receive the substrate 12 on which the regions 14, 18 and 16 are to be deposited but is slightly deeper than the thickness of the substrate.

To make the semiconductor injection laser 10, the substrate 12, which has a chemically polished surface, is placed in the recess 44 with the polished surface facing upwardly. Separate charges are placed in each of the wells 34, 36 and 38. Each of the charges is a mixture comprising the semiconductor material of the particular region to be deposited, a metal solvent for the semiconductor material and a suitable dopant. The ingredients of the charges are in granulated solid form at room temperature. For example, if the first region 14 is to be N type gallium aluminum arsenide, the charge in the first well 34 may comprise a mixture of 5 grams gallium as the solvent, 900 milligrams gallium arsenide, 10 milligrams aluminum and 2 milligrams tellurium as the N type dopant. If the third region 18 is to be compensated P type gallium arsenide the charge in the second well 36 may comprise a mixture of 5 grams gallium, 750 milligrams gallium arsenide, 20 milligrams silicon and 2 milligrams zinc. If the second region 16 is to be P type gallium aluminum arsenide, the charge in the third well 38 may comprise a mixture of 5 grams gallium, 900 milligrams gallium arsenide, 10 milligrams aluminum and 35 milligrams zinc as the P type dopant.

The loaded furnace boat 32 is then placed in a furnace tube (not shown) and a flow of high purity hydrogen is provided through the furnace tube and over the furnace boat 32. The heating means of the furnace tube is turned on to heat the furnace boat 32 and its contents to a temperature at which the charges in the wells 34, 36 and 38 become molten and suitable for epitaxial regrowth, i.e., approximately 900°C. When the gallium becomes molten, the other ingredients of each of the charges dissolve in the molten gallium. Thus, the charge in the first well 34 becomes a first solution 46, which in this example is gallium arsenide, aluminum and the N type dopant, tellurium, dissolved in the gallium. The charge in the second well 36 becomes a second solution 48, which in this example is gallium arsenide, the amphoteric type dopant silicon and the P type dopant, zinc, dissolved in the gallium. The charge in the third well 38 becomes the third solution 50, which in this example is gallium arsenide, aluminum and the P type dopant, zinc, dissolved in gallium. This temperature is maintained for a period to insure a completely homogeneous solution in each of the wells.

The slide 42 is then moved in the direction shown by the arrow 52 in FIG. 3 so as to carry the substrate 12 into the first well 34 and bring the surface of the substrate into contact with the first solution 46. The temperature of the furnace tube is then reduced so as to permit the first solution 46 to cool at a controlled rate. As the first solution 46 cools, some of the gallium arsenide in the first solution precipitates and deposits on the surface of the substrate 12 as the first epitaxial region 14. Some of the aluminum in the first solution 14 becomes incorporated in the first epitaxial region 14, replacing some of the gallium ions of the gallium arsenide so that the first region is gallium aluminum arsenide. Also, some of the tellurium present in the first solution 46 becomes incorporated in the crystal lattice of the first epitaxial region so that the first epitaxial region is N type gallium aluminum arsenide. In this example, the first solution 46 is cooled from about 900°C to about 885°C in a period of 2¾ minutes so as to provide a first region 14 of N type gallium aluminum arsenide, $Ga_{0.9}Al_{0.1}As$, which is about 3 microns in thickness.

The slide 42 is then again moved in the direction of the arrow 52 to carry the substrate 12 from the first well 34 into the second well 36 where the surface of the first region 14 is brought into contact with the second solution 48. Some of the gallium arsenide in the second solution 48 precipitates and deposits on the surface of the first region 14 to form the third epitaxial region 18. In this example, some of the silicon and the zinc in the second solution 48 becomes incorporated in the crystal lattice of the third epitaxial region 18 so that the third region 18 is of compensated P type gallium arsenide. Since the third region 18 is very thin, between 0.2 and 0.3 microns in thickness, the substrate is maintained in the second well 36 for only a short period of time. In fact, in this example, the substrate is merely moved through the second well 36 without stopping with the second solution 48 being at a temperature of about 885°C to achieve the third region 18 of the desired thickness.

The slide 42 is then again moved in the direction of the arrow 52 to carry the substrate 12 into the third well 38 where the surface of the third region 18 is brought into contact with the third solution 50. The reduction of the temperature of the furnace tube is continued so as to cool the third solution 50 at a controlled rate. This results in some of the gallium arsenide in the third solution 50 precipating and deposition on the third region 18 to form the second epitaxial region 16. As with the first solution 46, some of the aluminum in the third solution 50 becomes incorporated in the second region 16 replacing some of the gallium ions of gallium arsenide so that the second region 16 is gallium aluminum arsenide. Also, some of the zinc in the third solution 44 becomes incorporated in the crystal lattice of the second region 16 so that the second region 16 is P type gallium aluminum arsenide $Ga_{0.9}Al_{0.1}As$. In this example, the third solution 44 is cooled from about 885°C to about 875°C in about 30 seconds so as to provide a second region 16 which is about 1.5 mils in thickness. The slide 42 is then again moved in the direction of the arrow 46 to carry the substrate out of the third well 38 and to permit the substrate with the regions deposited thereon to be removed from the slide.

We claim:

1. A semiconductor injection laser comprising a body of single crystalline semiconductor material having a first region of one conductivity type, a second region of a conductivity type opposite to that of the first region and a third region of either conductivity type between said first and second regions, the junctions between the third region and each of the first and second regions being heterojunctions which are substantially parallel and extending to an edge of said body, the third region being of a thickness of between 0.2 and 0.3 microns and having an index of refraction at the lasing wavelength which is slightly higher but no greater than 0.05 higher than the index of refraction of each of the first and second regions.

2. A semiconductor laser in accordance with claim 1 in which the third region contains both P type and N type dopants so as to be a compensated region but including more of one of the type dopants than of the other type dopant depending on the conductivity type desired for the third region.

3. The semiconductor injection laser in accordance with claim 2 in which the total concentration of the dopants in the third region is about $10^{19} cm^{-3}$ and the difference of the dopant concentration between the two type dopants is about $10^{17} cm^{-3}$.

4. The semiconductor injection laser in accordance with claim 3 in which the dopant concentration in each of the first and second regions is about $10^{18} cm^{-3}$.

5. The semiconductor injection laser in accordance with claim 1 in which each of the first and second regions are of a semiconductor material having a band gap energy slightly higher than the band gap energy of the semiconductor material of the third region so as to provide the difference in the index of refraction between the third regions and each of the first and second regions.

6. The semiconductor injection laser in accordance with claim 5 in which the band gap energy of the semiconductor materials of each of the first and second regions is no greater than about 0.2eV higher than the band gap energy of the semiconductor material of the third region.

7. The semiconductor injection laser in accordance with claim 6 in which each of the first and second regions are of single crystalline gallium aluminum arsenide and the third region is of single crystalline gallium arsenide.

8. The semiconductor injection laser in accordance with claim 6 in which each of the first and second regions are of single crystalline gallium aluminum arsenide and the third region is of single crystalline gallium aluminum arsenide having a smaller content of aluminum than the semiconductor materials of each of the first and second regions.

* * * * *